May 20, 1924.
A. STOWERS ET AL
ART OF PRODUCING MOTION PICTURES AND SOUND SYNCHRONIZED THEREWITH
Original Filed Oct. 1, 1921    5 Sheets-Sheet 4
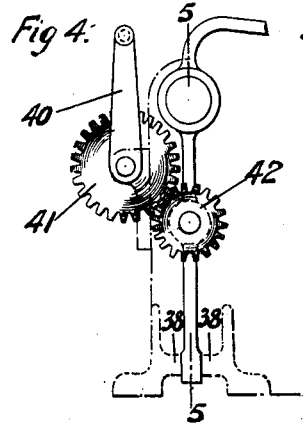
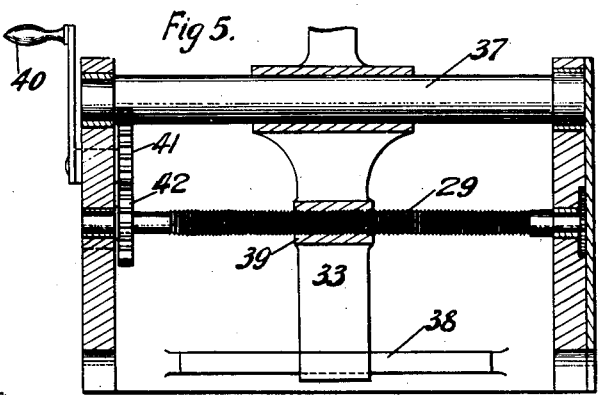
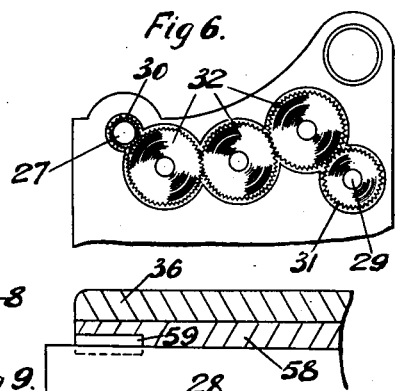
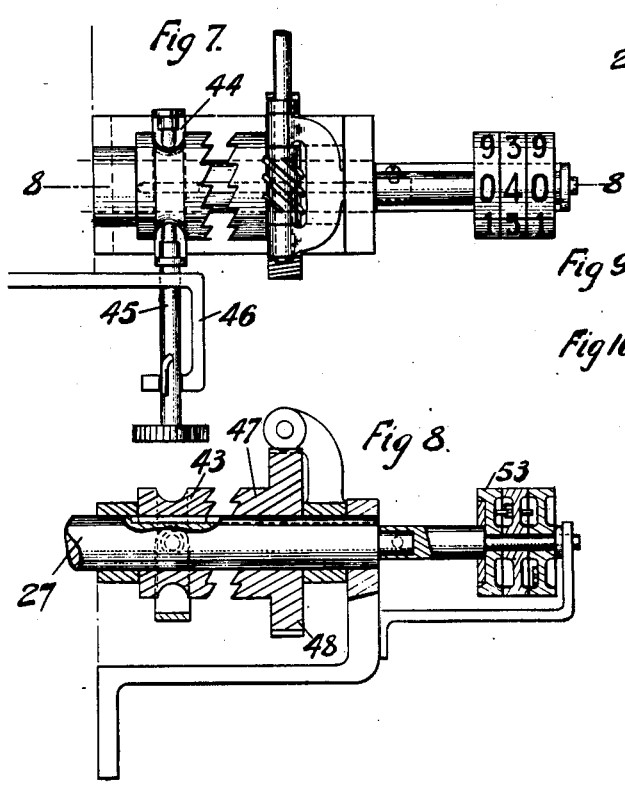
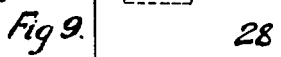
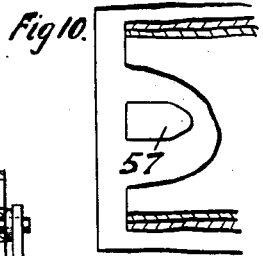
Inventors
Allen Stowers & Leo DeHymel
By
Attorney May 20, 1924.
A. STOWERS ET AL
1,494,514
ART OF PRODUCING MOTION PICTURES AND SOUND SYNCHRONIZED THEREWITH
Original Filed Oct. 1, 1921   5 Sheets-Sheet 5
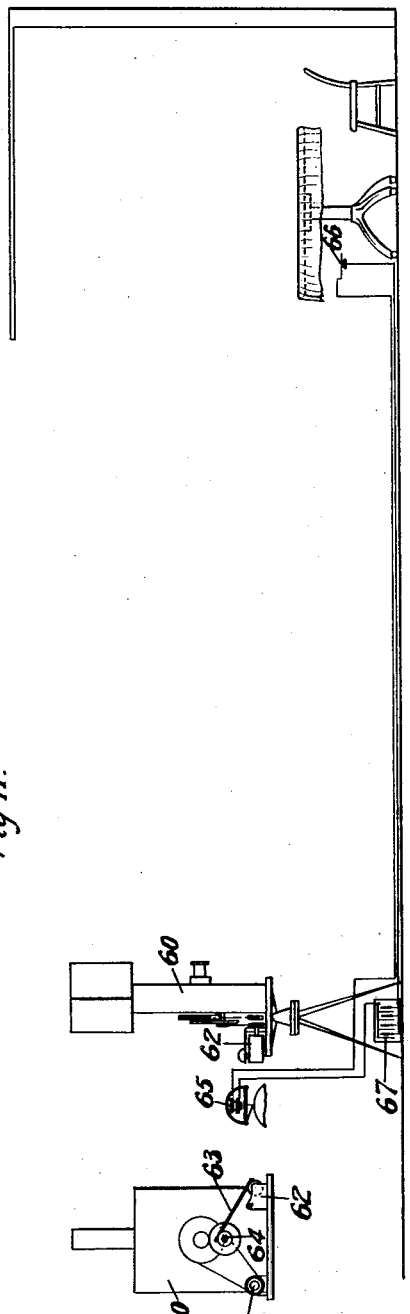
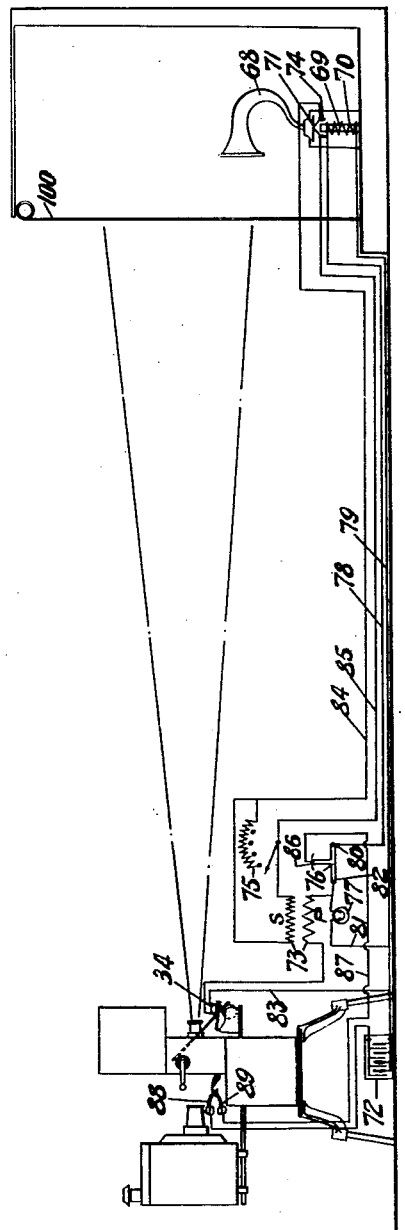
Inventors
Allen Stowers & Leo DeHymel
By
Attorney Patented May 20, 1924.

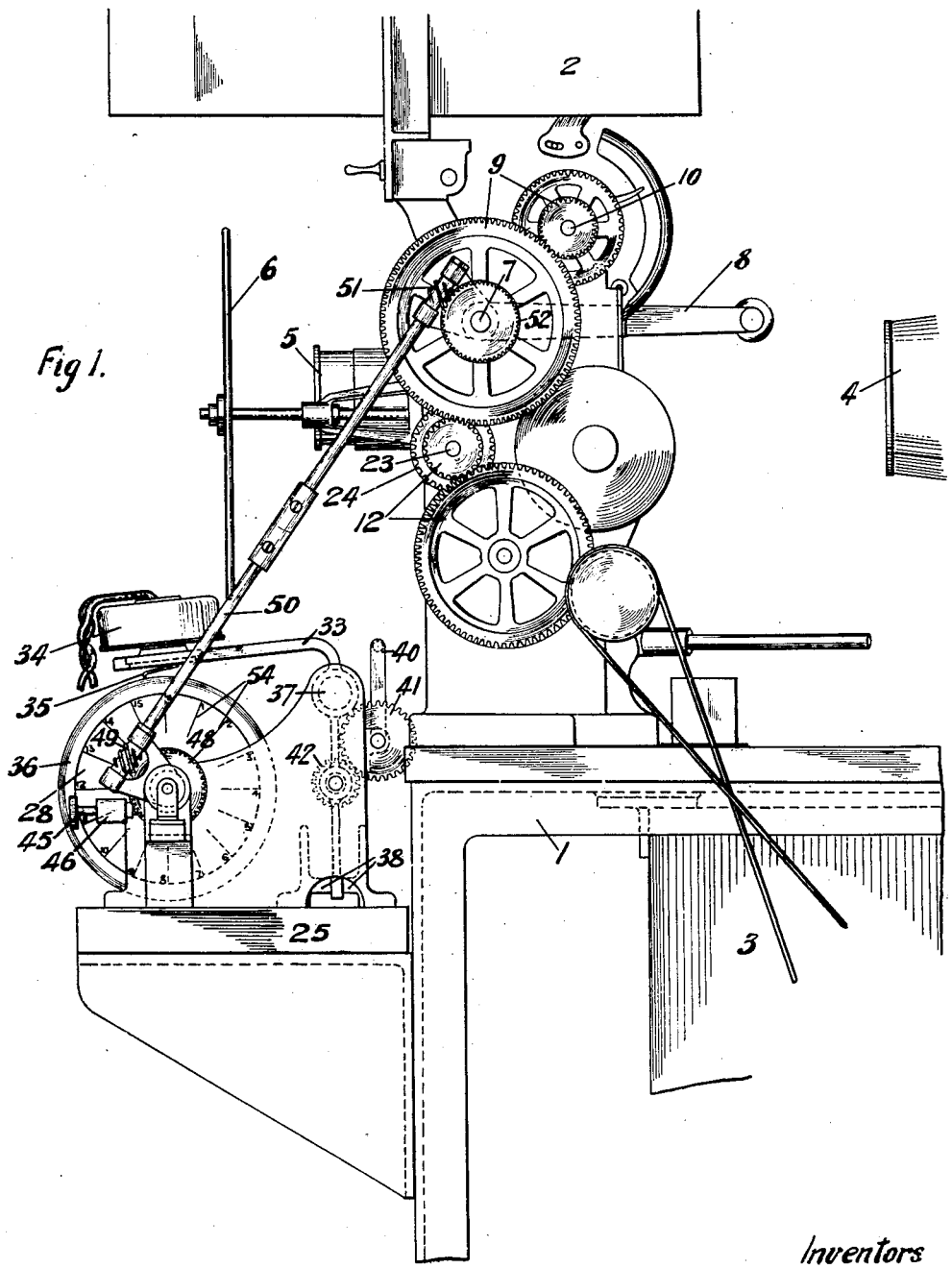

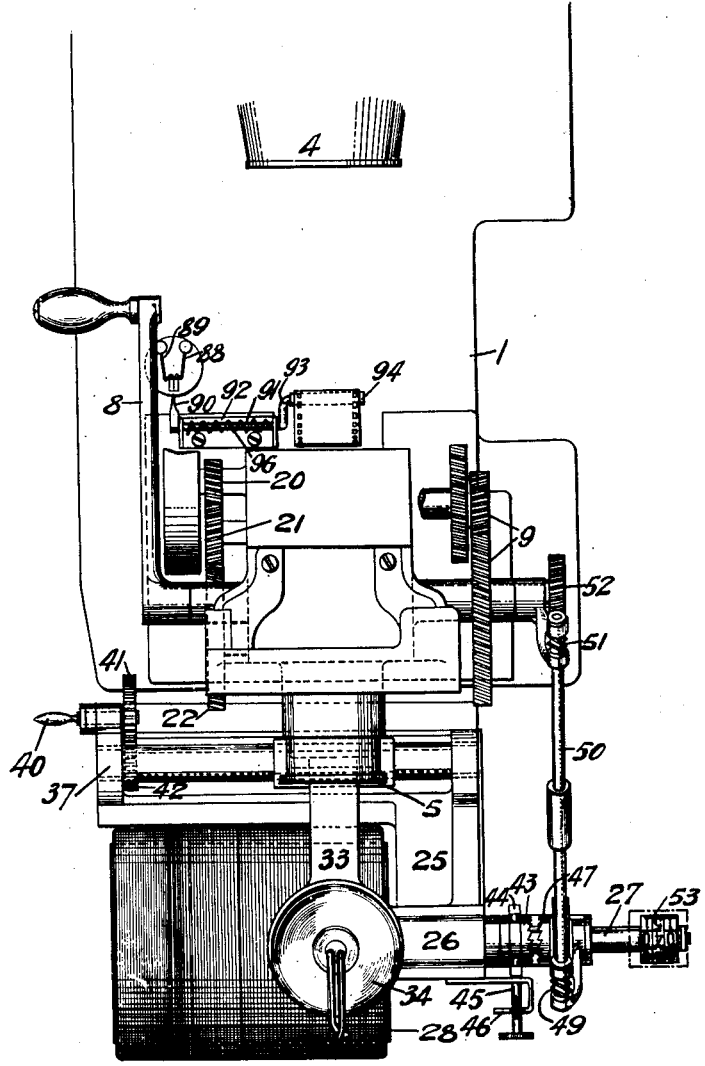

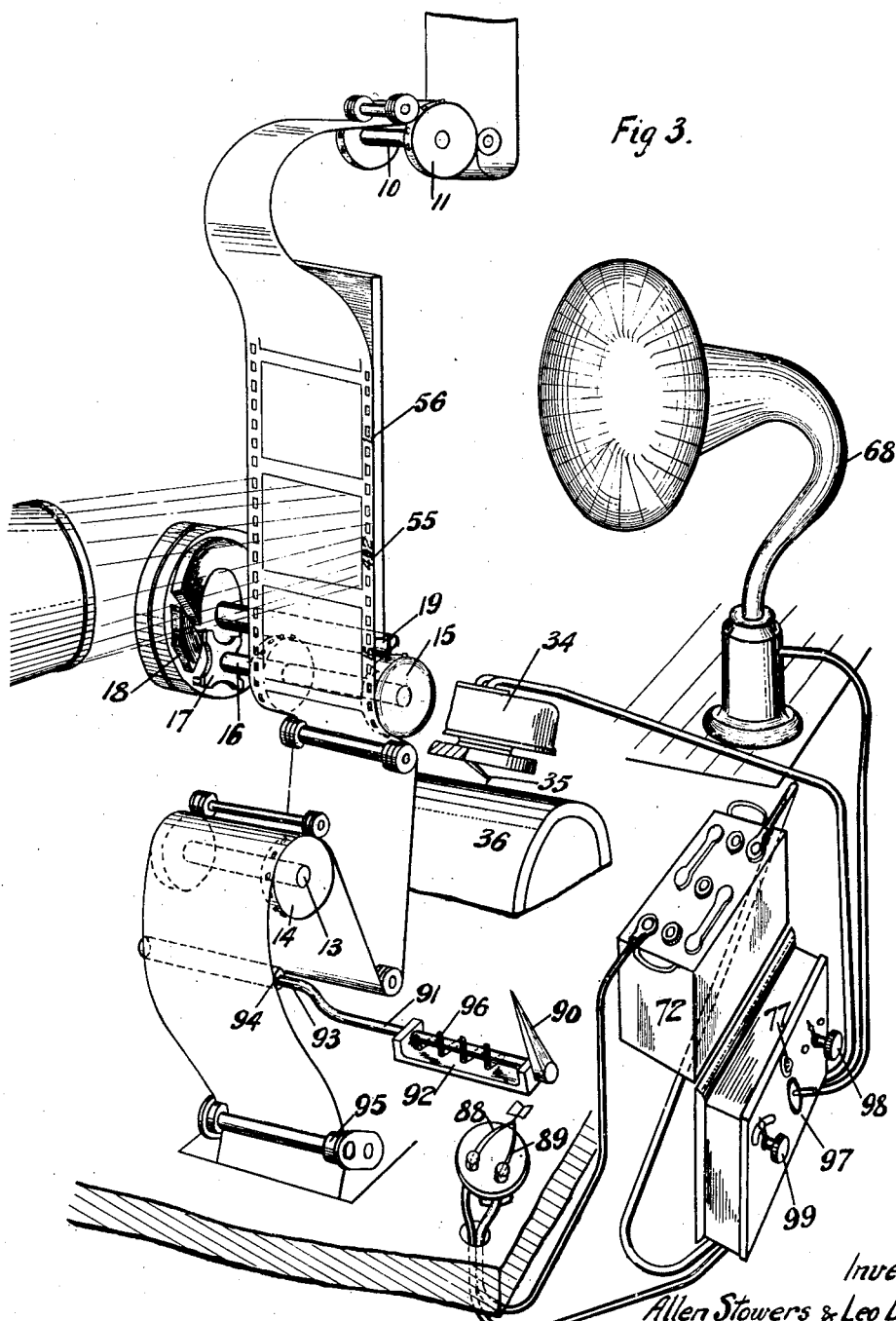

1,494,514

UNITED STATES PATENT OFFICE.

ALLEN STOWERS, OF LAREDO, AND LEO DE HYMEL, OF SAN ANTONIO, TEXAS, ASSIGNORS TO THE ALEOGRAPH COMPANY, OF WILMINGTON, DELAWARE, A CORPORATION OF DELAWARE.

ART OF PRODUCING MOTION PICTURES AND SOUND SYNCHRONIZED THEREWITH.

Application filed October 1, 1921, Serial No. 504,797. Renewed August 14, 1923.

*To all whom it may concern:*

Be it known that we, ALLEN STOWERS and LEO DE HYMEL, citizens of the United States, residing, respectively, at Laredo and San Antonio, in the counties of Webb and Bexar, respectively, and State of Texas, have invented new and useful Improvements in the Art of Producing Motion Pictures and Sound Synchronized Therewith, of which the following is a specification.

The present invention relates to improvements in the art of taking and projecting moving pictures and simultaneously recording or reproducing sounds appropriate to or accompanying the pictures. The primary object of the invention is to provide a novel and improved apparatus which is adapted to be applied to any of the usual or standard types of motion picture taking cameras or projecting machines and is capable of producing and maintaining exact synchronism between the phases of the pictures and the corresponding or accompanying sounds, the apparatus being simple and compact in construction, readily attachable to motion picture machines of the usual or standard types, and being capable of manipulation with substantially the same ease and facility as is the case in the operation of the usual or standard motion picture machines.

To accomplish these results, the invention provides means whereby exact correspondence between each picture on the film and the sound appropriate to or accompanying such picture is obtained in the taking of the pictures and the recording of the appropriate or accompanying sound, and when projecting the pictures and concurrently reproducing the sound, synchronization between the pictures and the corresponding or accompanying sound is produced and maintained by moving or advancing the picture film and the sound record at the precisely correct relative speeds and in exactly correct relation with one another.

The invention also provides means for initially setting the picture film and the sound record to synchronize them at the commencement of the projection of a picture or a part thereof contained on a length or reel of film and also to enable the projection of a picture to be continued in synchronism with the corresponding or accompanying sound after breakage of the film has occurred, for which purposes, the film is indexed with respect to its length, in units, and the pictures comprised in each unit of length of the film are sub-indexed, while the mandrel or equivalent part which supports or operates the sound record is provided with corresponding indexing means which enables the operator to easily and quickly re-establish synchronism between the sound record and the picture film at any point in the length of the film. This indexing system also enables broken picture film to be repaired in such manner that the repaired films, when run through the picture projecting machine, will synchronize exactly and throughout their length with the corresponding sound records. Automatic means is provided for immediately interrupting or suppressing sound should breakage of the film occur during its projection.

The invention also provides a sound reproducing machine which embodies means for insuring the correct setting of the sound record thereon to secure synchronization between it and the corresponding picture film, preparatory to the projection of the picture or a part thereof contained on the length or reel of film.

The invention further provides means for producing the appropriate or accompanying sound at or adjacent to the screen simultaneously with the projection of the respective or corresponding phases of the picture on the screen and with a strength or volume conforming substantially with the voice of an actor actually speaking the part of the character portrayed in the picture, the sound being so rendered as to be audible in all parts of the theatre or auditorium in close simulation to the natural or actual speaking of the part by the character or characters portrayed in the picture.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 1 represents a side elevation of a portion of a motion picture projecting machine of a well known standard type combined with sound reproducing means constructed in accordance with the preferred embodiment of the invention;

Figure 2 is a top plan view of the motion picture projecting machine and the sound reproducing means, as shown in Figure 1;

Figure 3 is a diagrammatic view showing in detail the application of the invention to a motion picture projecting machine;

Figure 4 illustrates in detail a device for restoring the sound reproducing means to its initial or starting position;

Figure 5 represents a section on the line 5—5 of Figure 4, it illustrating the advancing and restoring means for the reproducer of the sound reproducing means;
Figure 6 is a detail view showing the driving connection between the reproducer advancing means and the record supporting mandrel;

Figure 7 is a detail view, on an enlarged scale, showing in top plan part of the indexing means for the sound record and also showing a clutch which enables the sound record to be set to restore synchronism between the sound record and the picture film;

Figure 8 represents a section on the line 8—8 of Figure 7;

Figures 9 and 10 are detail views of a portion of the record and mandrel, showing indexing or registering means for insuring correct setting of the sound record on the mandrel.

Figure 11 is a diagrammatic view showing the method of taking the pictures and simultaneously recording the accompanying sounds in synchronism; and Figure 12 is a diagrammatic view showing the method of projecting the pictures and concurrently reproducing the sounds in synchronism with the pictures.

Similar parts are designated by the same reference characters in the several views.

The present invention is applicable generally to motion picture taking or projecting machines of various types, it being applicable readily to the usual or standard machines of this kind, the necessary driving connection between the sound recording or reproducing machine and the picture taking or reproducing machine, to insure motion of the sound record and the picture film in correct predetermined relation, being easily supplied. In the present instance, the preferred embodiment of the invention is shown applied to a motion picture projecting machine of a well known standard construction. It is to be understood, however, that the invention is applicable to motion picture taking or projecting machines of other types and also that the invention is not restricted to the precise construction shown, as equivalent constructions are contemplated and these will be included within the scope of the claims.

In the present instance, 1 designates the base or stand of a well known and standard type of motion picture projecting machine, 2 and 3 representing the housings for the film reels, 4 the front end of the lamphouse, 5 the projecting lens and 6 the usual revolving shutter. The main shaft 7 of the picture projecting machine may be electric-motor operated or, as shown, it is manually operated by the usual crank 8. This main shaft 7 operates in the usual way through gears 9 to revolve the shaft 10 on which the continuously revolving film-feeding sprockets 11 are mounted and the main shaft also operates through gears 12 to drive the shaft 13 on which the continuously revolving film-advancing sprockets 14 are mounted, the picture film is advanced intermittently so as to position the longitudinally-spaced pictures thereon successively in the optical axis of the machine, this intermittent film advance being effected in the usual way by sprockets 15 which are fixed on a shaft 16, the latter having one member 17 of the intermittent or Geneva movement fixed thereon, the other member 18 of the intermittent or Geneva movement being mounted in the usual way on a shaft 19 and this latter shaft is driven continuously by a gear 20 fixed on the shaft 19, an idler gear 21 and a gear 22, the latter being fixed on the shaft 23 which, as shown, carries one of the gears 12. A gear 24 fixed on this shaft 23 also drives the rotary shutter 6, as is shown in machines of this type.

The sound reproducting means is preferably located on the same stand or base 1 which supports the projecting machine and it preferably comprises a phonograph of the type employing cylindrical records. As shown, the phonograph comprises a base 25 which supports it on the stand or base 1, this base 25 having a bearing 26 in which is revolubly journalled the shaft or spindle 27 to which a suitably tapered record-receiving mandrel 28 is fixed. The mandrel-supporting shaft 27, as is shown in Figure 6, is connected to a screw 29 by pinions 30 and 31 which are fixed on the shaft 27 and screw 29 respectively and a train of intermediate idler gears 32 so that the screw 29 will revolve at a definite speed in relation to the spindle or shaft 27 of the mandrel. The screw 29 serves to advance the carriage 33 which supports the reproducer 34, so that the stylus 35 of the reproducer will correctly follow the sound groove which is formed helically in the circumference of the record 36, the record removably fitting on the mandrel 28. The carriage 33 is slidably supported by the bar or rail 37 and it is guided at its lower end by the parallel rails 38. The carriage is also provided with a nut 39 which, unlike the split nut ordinarily employed in phonographs, is of the solid type, so that it is permanently engaged with the screw. During the reproduction of the record, the carriage and the sound reproducer thereon are advanced so as to properly follow the sound groove in the record by the gearing which connects the screw with the shaft or spindle of the mandrel and after the sound reproduction has been completed, the carriage and sound reproducer are restored to their initial or starting position by revolving the screw and mandrel in reverse directions. Any suitable means may be provided for accomplishing this result, a crank 40 being provided for this purpose in the present instance which is fixed to a gear 41, which gear in turn meshes with a gear 42 which is preferably smaller and is fixed on the screw.

The shaft 27 which carries the record-receiving mandrel is provided with a clutch whereby it may be connected to and disconnected from its driving means. As shown in the present instance, the clutch comprises a member 43 which is splined on the shaft 27 and is provided with a clutch-shifting yoke 44 operated by a shaft 45 mounted in a suitable bracket 46. The other member 47 of the clutch is mounted loosely on the mandrel shaft 27 and is fixed or otherwise connected to a driving gear 48. The gear 48 is driven preferably by a worm or spiral gear 49 fixed to a motion-transmitting shaft 50, this shaft being driven in definite predetermined relation with the advancement of the film in the projecting machine by a worm or spiral gear 51 on the shaft 50 which meshes with a spiral or other suitable gear 52 fixed preferably on the main shaft 7 of the projecting machine. The mandrel shaft 27 is operatively connected to a suitable revolution counter 53 which may be of any suitable construction employing, for example, a suitable number of counter wheels or disks with carry devices between them, so that the counter will indicate the number of revolutions made by the record mandrel at any point in the operation of the phonograph, and furthermore, the revolution counter is of a type which is reversible; that is to say, it will be reset to zero by reverse revolution of the mandrel shaft. The mandrel of the phonograph is also provided with a circumferential index 54, the sub-divisions of which correspond with the number of pictures comprised within a given unit of length of the picture film, each complete revolution of the mandrel corresponding with such unit of length of the picture film. We have found that in projecting machines known as "Powers No. 6A" each revolution of the main shaft 7 advances one foot of film through the machine, and by using gearing of the proper ratio and taking motion from this main shaft 7, the shaft 50 will cause the record mandrel of the phonograph to make one complete revolution for each revolution of the main shaft 7, and hence for each foot of film fed through the projecting machine. Also, it is the common practice to provide sixteen pictures for each foot of film and accordingly the circumferential scale 54 for the record mandrel is sub-divided into sixteen parts, each sub-division corresponding with a picture comprised in the unit length of film. In practice the positive picture film, according to the present invention, is provided with an index preferably along one of its edges which corresponds with and indicates the different unit lengths of the film and the film is also provided with sub-indexes which correspond with and identify the different pictures comprised within each unit length of film. Preferably and as shown in the present instance, the picture film is divided into one foot lengths and a series of numerals 55 which run consecutively and start at the beginning of the film are printed or otherwise applied to an edge of the film so that any foot length throughout the entire length of the film can be immediately identified by the operator by merely inspecting the film at or in the region of the aperture plate of the projecting machine. Also, each foot length of film is provided with a series of consecutively arranged numerals 56, one of these numerals being provided for each picture comprised within each foot length of the film and these latter numerals enable the operator of the projecting machine to immediately determine, by mere inspection of the film, which picture of the series comprised within each unit or foot length of film is in position to be projected onto the screen. As shown, the first picture in each foot length bears the numeral which indicates that particular foot length of film and the remaining pictures of the series comprised in such foot length of film bear the numerals 1 to 15 inclusive arranged consecutively. By driving the sound record mandrel at the same speed at which the main shaft 7 is driven, it will be understood that each revolution of the shaft 7 which causes one foot length of film to pass through the projecting machine will cause the mandrel to make one complete revolution. The counter 53 which is actuated by the mandrel will indicate the number of complete revolutions made by the record mandrel and the reading of this counter will correspond with the index mark showing the particular unit or foot length of film in position for production. Also, each one-sixteenth revolution of the record mandrel will correspond with the movement of the film which carries one picture out of projecting position and brings the next picture in position for projection, and hence each time one of the circumferential index marks 54 is in register with the reproducing stylus 34, the corresponding picture comprised within the respective length of film will be in position for projection. The clutch comprising the members 43 and 47 is provided to enable the record mandrel to be revolved independently of its driving connection with the picture film to enable the sound record to be initially set in synchronism with the film at the commencement of the projection of the film and to also enable the sound record mandrel to be disconnected from the film advancing means and to be revolved independently to restore synchronism between the film and the sound record, should this become necessary during the projection of the film, owing to breakage of the film or similar cause. To accomplish this result, the clutch should be of a type which will enable the mandrel to be set in any one of sixteen different positions relatively to the driving gear 48. For example, as shown, the clutch is of the toothed-jaw type employing sixteen teeth. In other to insure correct placing of the sound record 36 on the mandrel 28 so that the starting point on the sound record will correspond exactly with the starting point on the picture film, means is provided whereby the sound record can be placed on the mandrel in one position only and which is the correct one. Any suitable means may be provided for this purpose, a tapered key 57 being provided in the present instance which is fixed in the periphery of the mandrel 28 toward the end thereof opposite to the end to which the record is applied, and the record which may be of the wax type or any other suitable kind may be provided with a metal lining or sleeve 58, one end of which is formed with a keyway 59 to receive the key 57 when the record is applied in the proper circumferential position on the mandrel. Ordinarily, the mandrel in phonographs of the cylinder type is tapered and the record is correspondingly tapered interiorly, this insuring application of the larger end of the bore of the record to the mandrel, and the keyway 59 is formed in the larger end of the bore of the record. Obviously, unless the record is properly applied to the mandrel so that the key 57 thereon enters the keyway, it will be impossible to fit the record on the mandrel.

According to the present invention, the sound recorded on the record in exact synchronism with the pictures on the film throughout the length of the film and the sound groove on the record and in the projecting of the picture and the reproduction of the sound, the sound is emitted at or in the immediate vicinity of the screen simultaneously with the appearance of the corresponding picture projected from the film onto the screen. To accomplish this result, the original picture film negative and the sound record are made simultaneously and the apparatus shown diagrammatically in Figure 11 may be used for this purpose. In this figure, 60 represents a motion picture taking machine or camera of any of the well known or standard types employed for the production of an original motion picture negative, it being understood that motion picture taking machines or cameras, as commonly used take the pictures so that the pictures are arranged longitudinally on the negative and a given number of pictures are comprised within each unit length of negative film. It is usual to take the pictures so that sixteen pictures are comprised within each one foot length of the film. In carrying out the invention, the pictures may be taken in the usual way, the camera or motion picture taking machine being usually driven by an electric motor 61 and the phonograph or sound recording device 62 is mounted on the same base with or adjacent to the camera and is driven synchronously therewith by a shaft 63 which takes its motion from the main shaft 64 of the camera, through suitable gearing through the operation of which the phonograph record is driven, for example, through exactly one revolution for each foot length of negative film fed through the camera. The phonograph or sound recording device 62 employed in conjunction with the camera in the taking of the pictures and the recording of the accompanying sounds may correspond substantially with the phonograph hereinbefore described as combined with the picture projecting machine and the shaft 63 which serves to drive the recording phonograph from the camera may correspond with the shaft 50 and the gearing hereinbefore described which causes the mandrel of the phonograph to revolve in synchronism with the movement of the negative film through the camera. In recording the sounds to accompany the picture, a recorder 65 is employed which may, as shown, be of the telephone receiver type, this recorder being connected in circuit with a transmitter 66 which may be of the detectorgraph type or any other suitable type of microphone, and a suitable battery 67, the transmitter 66 is located in the vicinity of the actor and it will be understood that any suitable number of transmitters may be employed in order to record the sounds in any desired manner. Owing to the close proximity of the transmitter to the action being photographed and the use of an electric circuit for transmitting the sounds for recording on the phonograph record, the sounds recorded will be synchronized with the phases of the pictures photographed on the negative film.

In projecting the pictures from the positive films obtained in the usual way from the original negative films, the phonograph or sound-reproducing device is fitted with a sound reproducer 34 which is of the microphone type and a loud speaking amplifier 68 is placed behind or in the immediate vicinity of the screen upon which the pictures are printed. The loud-speaking amplifier may be of any suitable or well known type, the amplifier shown, for example, in the present instance being of a well known type comprising an electromagnet having a core 69 and magnetizing coil 70 which establishes a magnetic field around the upper end of the core, a vibratory diaphragm 71 and a coil 74 attached to the diaphragm and connected to receive the undulatory current to modify the magnetic field created by the electromagnet and to thus vibrate the diaphragm 71 to reproduce in amplified volume the sound recorded on the phonograph record. Suitable electric circuits and electric devices are provided for operatively connecting the reproducing transmitter of the phonograph with the amplifier. As shown, for example, a battery 72 supplied the source of electric current for the system, an induction coil or transformer 73 is connected between the reproducing transmitter 34 and the amplifier 68, a rheostat 75 regulates the strength or volume of sound produced by the amplifier, a manual switch controls the operation of the system and a lamp 77 indicates to the operator whether the system is in operative or inoperative position. In the sound reproducing system shown in the present instance, the coil 70 of the electromagnet of the amplifier is connected to the terminals of the battery 72 by the wires 78 and 79, the wire 78 being connected to a terminal 80 of the manual switch 76 so that the amplifier will be energized and deenergized by closing and opening respectively the switch 76. The indicator lamp 77 is connected by the wire 81 to the terminal 82 of the switch 76 and to the terminal of the battery to which the conductor 79 is connected. The transmitter 34 has one of its terminals connected as by the wire 83 to one terminal of the battery 72 and the other terminal of the transmitter is connected to the primary P of the induction coil or transformer 73, this primary of the induction coil being connected in the present instance to the terminal 82 of the switch 76. The secondary S of the inductance coil or transformer 73 is connected by the wires 84 and 85 to the coil 74 of the amplifier and the rheostat 75 is bridged across these wires 84 and 85 so that by short-circuiting these wires through more or less resistance, the volume of sound produced by the amplifier may be regulated as desired, the rheostat in effect short circuiting through more or less resistance the terminals of the secondary of the transformer in which the undulatory currents to operate the coil 72 are induced from the primary P which is connected in the circuit with the transmitter 34. The switch 76 is also provided with a terminal 86 which is always in contact with the switch arm and this terminal is connected by the wire 87 to the return side or terminal of the battery 72.

The present invention provides means for automatically interrupting or suppressing the sound produced by the phonograph or sound-reproducing device, in the event that the picture film breaks during projection thereof. Preferably and as shown, this device comprises a switch which embodies a pair of contacts 88 and 89 which are connected in circuit with the wire 87. These contacts are preferably resilient and their inherent action tends to hold them in contact with one another, thus completing the return circuit of the battery through the wire 87. An arm or finger 90 is adapted to engage between the contacts 88 and 89, the said arm being composed of insulating material and when the arm 90 moves into such position, the contacts 88 and 89 are separated and the return circuit of the battery 72 is then broken with the result that the sound-reproducing system is immediately rendered inoperative. The controlling arm or finger 90 is governed automatically by the film so that while the film is passing through the projecting machine in continuous or unbroken condition, the arm or finger 90 will be held in an inoperative position and the contacts 88 and 89 will then be closed, but in the event that the film breaks, the arm or finger 90 will instantly swing into a position between the contacts 88 and 89, thus separating them and interrupting the return circuit of the battery. Preferably and as shown, the arm or finger 90 is fixed to a shaft 91 which is rotatably fitted in a suitable bracket 92 which may be fastened on the base of the projecting machine, the shaft 91 having an offset or crank-shaped end 93 provided preferably with a roller 94. This roller 94 is normally held against the forward side of that portion of the picture film which extends between the film advancing sprockets 14 and idler rollers 95, which latter are mounted above or at the entrance to the casing or housing 3 which contains the film winding or take-up spool. The roller 94 is pressed against the film at this point by the action of a spring 96. While the film is unbroken, the movement of the arm or finger 90, under action of the spring 96, will be resisted, so that this arm will not separate the contacts 88 and 89. Upon breakage of the film, however, the broken end thereof will pass immediately over the sprockets 14 and between the idler rollers 95 and onto the film take-up spool, in consequence of which the roller 94 will be unsupported and the spring 96 will immediately swing the arm or finger 90 downwardly and into a position to separate the contacts 88 and 89, thus breaking the battery circuit which supplies electric current to the sound reproducing system, and hence immediately interrupting or suppressing the sound. The induction coil 73, rheostat 75, manual switch 76 and lamp 77 may be contained within a box 97 and this box may be located on or adjacent to the projecting machine, and hence within convenient reach of the operator of the projecting machine, the button 98 serving to operate or adjust the rheostat and the button 99 serving to operate the manual switch 76. 100 represents diagrammatically the screen onto which the pictures are projected. Where the screen is of a porous nature, the horn of the amplifier may be immediately behind it, as is shown in Figure 12. Where the non-porous type of screen is employed, the amplifier may be located in any suitable position adjacent to the screen.

The operation is briefly as follows: The picture is taken and the appropriate sounds, whether voice or otherwise, are recorded simultaneously and preferably in synchronism in the manner hereinbefore described and owing to the definite relation thus established between the picture film and the sound record and the circumstance that the sound transmitter during the taking of the picture and the recording of the sound is located in immediate proximity to the actor portrayed in the picture, exact correspondence between the various phases of the pitcure and the accompanying sound is established.

The positive picture films printed or otherwise produced from the original negative are provided, in any suitable way, with the indexing which comprises the numerals 55 corresponding to the unit lengths of the film and the subnumerals 56 which correspond to the series of pictures comprised in each unit length of the film. By placing the film in the projecting machine so that its starting point will be in proper relation with the aperture through which the projecting light passes and then placing the sound record on the mandrel of the phonograph or sound-reproducing device so that the key 57 on the mandrel properly engages in the keyway 57 in the record, care being taken that the counter 53 registers to correspond with the starting point on the film as to unit length thereof and that the proper circumferential index mark 54 on the mandrel registers with the reproducing stylus 35 to correspond with the picture on the film in position to be projected, the clutch members 43 and 47 being engaged, the projecting machine may be operated in the manner commonly followed in the operation of motion picture projecting machines of the standard types, the film being fed through the machine and the phonograph record being revolved in unison therewith, the revolution counter 53 of the phonograph registering the revolution of the sound record in synchronism with the passage of each foot or unit length of film through the projecting machine, while the circumferential index 54 will register with the reproducing stylus 35 in synchronism with the movement of the pictures comprised in each foot or unit length of the film past the projecting point. In this way, the sounds which were recorded on the sound record in synchronism with the taking of the pictures will be reproduced in synchronism with these pictures as they are projected onto the screen and by the use of sound-reproducing apparatus substantially as hereinbefore described, or an equivalent apparatus, the reproduced sound will be emitted in appropriate volume at a point or points at or near the screen onto which the pictures are projected, so that an effect is obtained which will closely simulate the natural speaking of the parts by the actors portrayed in the picture. The synchronism between the pictures and sound established at the commencement of the projection of the picture will be maintained throughout the projection of the entire length. If the film should happen to break during its projection, the sound reproduction will be interrupted or suppressed immediately, and to resume the projection of the film it is only necessary for the operator to temporarily attach the broken ends of the film and rethread the machine in the usual way, to note the particular unit length of film, as indicated by the numeral 55 and the particular subnumeral 56, which indicates the particular picture of the group contained in such unit length of film and to then disengage the clutch member 43 from the clutch member 47, to revolve the sound record and mandrel until the revolution counter 53 registers the number corresponding to the unit length index number 55 and the circumferential index number 54 on the mandrel corresponding to the sub-index number 56 of the picture in position for projection registers with the stylus 34, whereupon the clutch member 43 may be reengaged with the clutch member 47 and the projecting machine may be again started and operated in the usual way to project the remainder of the film, synchronism between the sound record and the picture film having been correctly reestablished by the resetting described. After the complete film has been projected, the film can be removed from the projecting machine and rewound in the usual way, and the corresponding sound record can be removed from the mandrel of the phonograph and the restoring crank 40 operated to revolve the mandrel and the screw 29 in a reverse direction until the counter 53 and index 54 have been returned to the initial or starting point, the machine being then ready to receive another reel of film and the sound record pertaining thereto.

By taking the picture and simultaneously recording the voice or other accompanying sounds with the aid of an apparatus, such as that hereinbefore described, which insures exact correspondence between the picture film and the sound record, owing to the constant or invariable ratio of movement taking place between the film and the sound record, synchronism is definitely established between the picture film and the sound record. By correspondingly indexing the picture film and sound record, both with respect to the unit lengths of the film and the individual pictures of each group comprised in each unit length of film, exact synchronism between the film and sound record can be easily and quickly established at the starting of the projection of the film and it can be with equal facility reestablished at any point in the length of the film, and such synchronism, when once established, will be maintained throughout the projection of the film, due to the exact correspondence established between the film and sound record during the simultaneous taking of the picture and recording of the sound and the projection of the picture and reproduction of the sound by operating the picture film and sound record at the same constant or invariable rate of movement which existed during the taking of the picture and the recording of the sound.

The present invention enables a sound record to be produced for each reel or length of film, and if it is desired to make the films in the usual length now commonly used and to employ one sound record for each film length, such can be done by arranging the convolutions of the sound groove sufficiently close to one another on the record and providing a record of suitable length.

The invention not only enables the projection of the picture and the reproduction of the accompanying sound to be resumed after breakage of the film has occurred, but it also enables synchronism to be maintained between the sound record and a film which has been patched or repaired after breakage, as the patching of the film can be done by inserting a piece of blank film of the same length as that cut out to make the repair, and in projecting such a film the sound reproduction will take place without interruption and without loss of synchronism, the blank section of the film passing through the projecting machine so rapidly as to be practically unnoticeable to the ordinary observer. Also shrinkage or other variation as might occur in the length of the picture film will not affect synchronization between the film and the sound record for the reason that the toothed sprockets which advance the film by engaging in the perforation of the film are connected to the sound record mandrel by a positive driving connection having a constant or invariable ratio of transmission and hence the relation between the individual pictures and the recorded sound will not vary.

The apparatus required to obtain the results hereinbefore described is relatively simple, inexpensive and compact and it is readily applicable to motion picture taking and projecting machines of the well known or standard types now in use. The sound reproducing phonograph may be located adjacent to or on the same base with the picture projecting machine and within easy reach of the operator so that one operator may easily attend to the projection of the pictures and the reproduction of the accompanying sounds.

The appropriate indexing of the original negative film may be done at the time the picture is taken in the camera and the corresponding indexing of the final positive films may be done during the printing of the latter films from the original negative or substantially thereto, it being necessary, however, that the indexing of the films correspond exactly with respect both to unit length of film and the individual pictures of each group comprised by each unit length of film, with the sound record. It will be understood that the sound record used in conjunction with the projection of each corresponding film may be either the original sound record on which the sound is recorded at the time the picture is taken or it may be one obtained by any suitable or well known method from such original record.

We claim as our invention:—

1. The combination with a motion picture machine having means for advancing a picture film having pictures in regular sequence thereon, of a phonograph having means for graduating a sound record in predetermined relation with the pictures on such picture film, and a positive driving connection between the film advancing means of the motion picture machine and the record advancing means of the phonograph for causing movement of both said advancing means at a predetermined invariable speed ratio, said driving connection including means for setting the phonograph in any one of a number of predetermined relationships with the motion picture machine to establish synchronism between any selected graduated part of the sound record and the corresponding picture of the film.

2. The combination of a motion picture machine having means for advancing a picture film therewith, a phonograph having a revoluble support for advancing a sound record, and means for positively connecting said film advancing means and said sound record support in any one of a number of predetermined relationships having a definite relation with the number of pictures on the film corresponding to each revolution of the sound record support, said connecting means being operative to produce and maintain a predetermined ratio of speed between the film advancing means and the sound record support.

3. The combination with a motion picture projecting machine having means for advancing a picture film bearing a series of pictures therethrough, of a sound reproducing device having a support for advancing a sound record, and a positive mechanical driving connection capable of establishing a predetermined relationship between the sound record and any one of the series of pictures on the film and operative to cause movement of said film advancing means and said sound record support at a predetermined invariable speed ratio.

4. The combination with a motion picture projecting machine having means for advancing a picture film having pictures arranged successively thereon, and a sound reproducing device having means for advancing a sound record, of a positive mechanical driving connection for causing operation of said film-advancing and record-advancing means at a predetermined invariable speed ratio thereby synchronizing the picture film and sound record, and means associated with said driving connection for establishing a predetermined synchronous relation between any one of the pictures on the film and the record-advancing means.

5. The combination with a motion picture projecting machine having picture film advancing means, and a sound record reproducing device having revoluble sound record advancing means, of a synchronizing connection between said film advancing and sound record advancing means, and a coupling associated with said connection for setting the latter in any one of a plurality of definite relations having a predetermined relationship with the number of pictures on the film corresponding to each revolution of the record advancing means, said coupling being operative to re-establish synchronism between any picture on the film and the sound record.

6. The combination with a motion picture projecting machine having picture film-advancing means, and a sound reproducing device having sound record-advancing means, of a driving connection between said film-advancing and record-advancing means for synchronizing the movements of the picture film and sound record, and a clutch associated with said connection and having means for setting it in a plurality of positions having a predetermined relation to the longitudinal spacing of the pictures on the film.

7. The combination with a motion picture projecting machine having means for advancing a picture film having pictures spaced longitudinally in regular sequence thereon, and a sound reproducing device having means for advancing a sound record, of index means associated with the sound record advancing means and graduated in accordance with the spacing of the pictures on the picture film, and driving means for connecting and synchronizing the operations of the film advancing and sound record advancing means, said driving means embodying a device for setting said driving means in accordance with each of the graduations of said index means to synchronize the sound record with any one of the pictures on the picture film.

8. The combination with a motion picture projecting machine having means for advancing a picture film therethrough, and a sound reproducing device having means for advancing a sound record, of means connecting and synchronizing the operations of the film advancing and sound-record advancing means, and index means invariably connected to operate in unison with the sound record advancing means when the latter is operated in both forward and reverse directions and corresponding to unit lengths of the picture film and also the individual pictures comprised in each unit length of the picture film.

9. The combination of a motion picture projecting machine having means for operating the picture film, and a sound reproducing device having means for operating a sound record, of connecting means for synchronizing the operations of the film and record, index means invariably connected to operate in unison with the sound record operating means and having indications corresponding with unit lengths of the film and also the pictures comprised within each unit length of film, and a clutch associated with said connecting means to enable resetting of the latter to bring the sound record into synchronism with the picture film with respect to any unit length thereof and also any picture comprised within such unit.

10. The combination of a motion picture projecting machine adapted to feed therethrough and project pictures from a film having pictures spaced longitudinally thereon and provided with an index which indicates predetermined unit lengths of the film and also the individual pictures comprised within each unit length, a sound reproducing device having index means invariably connected thereto to operate in unison therewith during both forward and reverse movements of the sound reproducing device and corresponding to the unit length and individual picture index of the picture film, and means for operating the film and sound record in synchronism.

11. The combination of a motion picture projecting machine adapted to feed therethrough and to project pictures successively from a motion picture film having an index which indicates predetermined unit lengths of the film and also the individual pictures comprised within each unit length, a sound reproducing device having index means invariably connected to operate in unison therewith and corresponding to the unit lengths and individual picture index of the film, a positive driving connection for causing operation of the film and sound reproducing device in synchronism, and a clutch associated with the sound reproducing device to enable alternation of the operative relation between the latter and the projecting machine to reestablish synchronism between the picture film and the sound reproducing device.

12. The combination with a motion picture projecting machine having means for feeding a motion picture film therethrough, of a sound reproducing device having a rotatable sound record support and a traversing reproducer associated therewith, index means invariably connected to the sound record support to maintain an invariable relation therewith when the record support is rotated in both forward and reverse directions for indicating the number of revolutions and predetermined fractions thereof made by the record support in either forward or reverse direction, and a positive connection for operating the projecting machine and sound reproducing device in synchronism.

13. The combination of a motion picture projecting machine adapted to feed therethrough and to project pictures successively from a motion picture film having an index which indicates the different unit lengths of film and also the individual pictures comprised within each unit length, a sound reproducing device having index means invariably connected to operate in unison therewith when the sound reproducing device is operated in both forward and reverse directions embodying indications corresponding with the unit lengths and the individual pictures of the film, and positive connecting means for causing synchronous operation of the projecting machine and the sound reproducing device whereby the film index and the index means of the sound reproducing device will be in agreement.

14. The combination of a motion picture projecting machine adapted to feed therethrough and to project pictures successively from a motion picture film having an index which indicates the different unit lengths of the film and also the individual pictures comprised within each unit length, a sound reproducing device, positive connecting means for operating the projecting machine and sound reproducing device in synchronism, and index means invariably connected to operate in unison with the sound reproducing device for indicating the corresponding positions of the sound reproducing device with respect to the different unit lengths of the film and the individual pictures comprised within such units.

15. The combination of a motion picture projecting machine adapted to feed therethrough and to project successively pictures from a motion picture film, a sound reproducing device, positive connecting means for operating the projecting machine and the sound reproducing device in synchronism, and index means invariably connected to operate in unison with the sound reproducing device for indicating the corresponding portions of the picture film during the progress of operation of the sound reproducing device, said connecting means including a device for setting the sound reproducing device in any one of a number of predetermined relationships with the picture film, whereby the operative relation between the projecting machine and the sound reproducing device may be set to reestablish synchronism between the sound reproducing device and the picture film.

16. The combination of a motion picture projecting machine, a sound reproducing device having a rotatable support for a sound record, an index invariably connected to said support to operate in unison therewith when said support is rotated in both forward and reverse directions, a cooperative traversing reproducer and means for causing traversing movement of the reproducer which constantly maintains operative relation with the record support during both forward and reverse rotation of the latter, and means for causing continuous synchronous operation of the sound reproducing device concurrently with the operation of the projecting machine.

17. The combination of a motion picture projecting machine, sound reproducing means embodying a rotatable support for a sound record, a traversing reproducer, and a device constantly connected to the record support for producing traversing movement of the reproducer, the record support and the device which produces the traversing movement of the reproducer operating in unison in both forward and reverse directions, and index means on the record support for locating a sound record thereon whereby the starting point on the sound record will correspond with the starting point on the film.

18. The combination with a motion picture projecting machine, of a sound reproducing device comprising a record support having means for preventing the mounting of a sound record thereon except in predetermined position with respect to the starting point of the record, revolution counting wheels operatively related to said starting point and connected to the record support to operate in unison therewith and means for causing operation of the projecting machine and the sound reproducing device with the picture film and sound record in synchronized relation.

19. The combination with a motion picture projecting machine for projecting pictures successively from a motion picture film, of sound reproducing means operative in synchronism with the projecting machine and including means for transmitting sound, and means operative in consequence of breakage of the film while passing through the projecting machine for interrupting the transmission of sound by the sound reproducing means independently of the operation of the projecting machine and the sound reproducing means.

20. The combination with a motion picture projecting machine, of sound reproducing means operative in synchronism with the projecting machine and embodying electrically energized sound amplifying means, and a film-controlled switch operative in consequence of breakage of the film being projected for de-energizing the sound amplifying means and thus interrupting the reproduction of sound.

21. A sound reproducing device for operation in conjunction with a motion picture projecting machine for the production of synchronized pictures and accompanying sounds comprising a rotatable support for a sound record having a convoluted sound groove therein, a reproducer to cooperate with the sound groove of the record, and a revolution counter operative in unison with the record support during both forward and reverse rotation of the latter for registering the number of revolutions made by the sound record.

22. A sound reproducing device for operation in conjunction with a motion picture projecting machine for the production of synchronized pictures and accompanying sounds comprising a rotatable support for a sound record having a convoluted sound groove therein, a reproducer to cooperate with the sound groove of the record, and a revolution counter operative in unison with the record support during both forward and reverse rotation of the record support for registering the number of revolutions made by the sound record and also predetermined portions of a revolution.

In testimony whereof we have hereunto set our hands in presence of two subscribing witnesses.

ALLEN STOWERS.
LEO DE HYMEL.

Witnesses:
  CHAS. S. HYER,
  C. A. BATEMAN.